Aug. 16, 1932.      E. G. T. GUSTAFSSON      1,871,848
PROCESS FOR PRODUCING METAL SPONGE
Filed Feb. 28, 1931      2 Sheets-Sheet 1
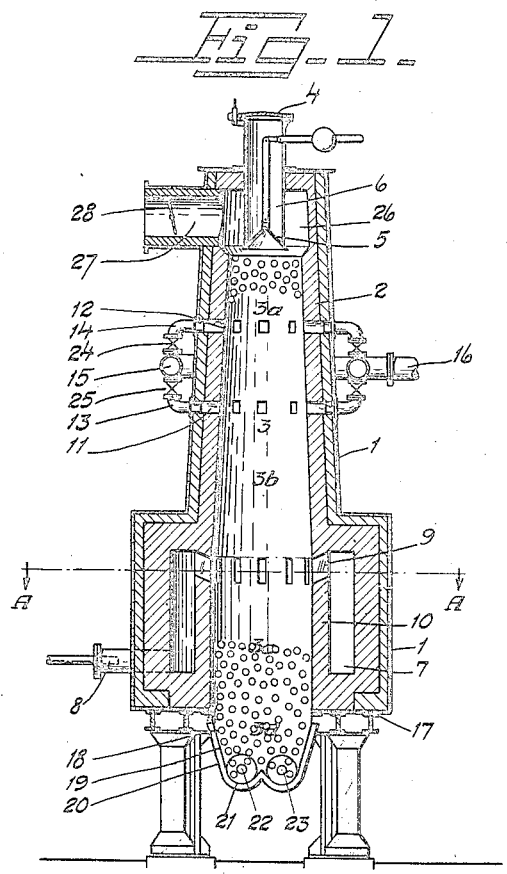
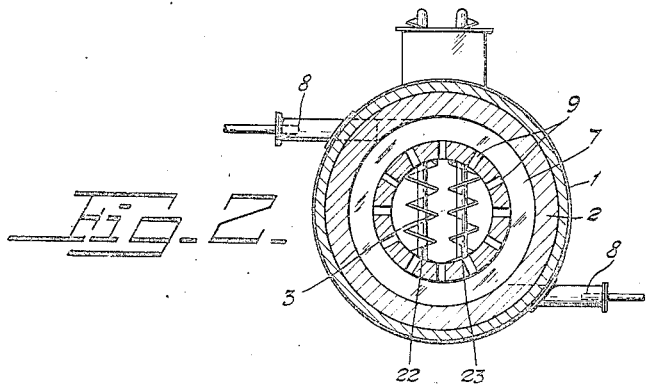
INVENTOR
Emil G. T. Gustafsson.

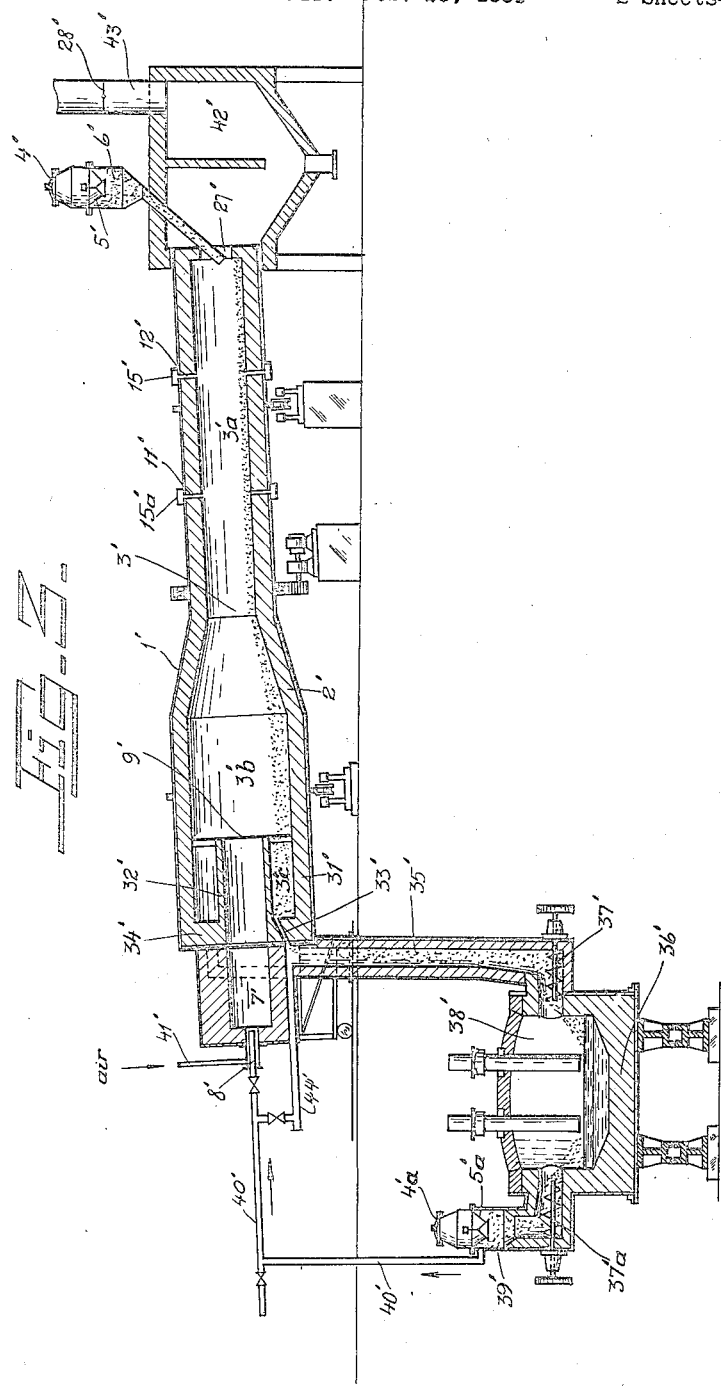

Patented Aug. 16, 1932

1,871,848

UNITED STATES PATENT OFFICE

EMIL GUSTAF TORVALD GUSTAFSSON, OF STOCKHOLM, SWEDEN

PROCESS FOR PRODUCING METAL SPONGE

Application filed February 28, 1931, Serial No. 519,160, and in Sweden March 6, 1930.

The present invention relates to improvements in processes for producing metal sponge, for instance sponge iron, cobalt, nickel, chrome and chrome-iron, from their oxide ores or other metal oxide containing material, in which the reduction is carried out with the ore in a finely divided state by means of finely divided reducing agent, for instance carbonaceous material alone or in admixture with thermic reducing agent, without fusing the ore or the metal during the reduction.

The process according to the invention is a modification of the method set forth in my copending application Serial No. 332,748 filed Jan. 15, 1929, and relating to charge in a briquetted state, whereby the process will become in some cases more suited to such a charge and also suitable for loose, non-briquetted charge.

According to the process set forth in the application mentioned, the ore is intimately mixed with reducing agent in excess and, if desired, a suitable binding agent, and the mixture is transformed into briquettes or other form of pieces with the particles of ore and reducing agent fixed in their relative positions in the briquettes or pieces, whereafter the heat required for carrying out the reduction is supplied to the briquettes by means of hot combustion gases in contact with the briquettes and of such oxidizing character that they burn at least part of the excess of reducing agent in the briquettes. The combustion gases may be developed, for instance, by combusting gaseous, liquid or solid fuel with air or other oxidizing gas in the furnace where the reduction is carried out or in a special combustion chamber in same.

As examples of carbonaceous reducing agent there are mentioned charcoal, semicoke, peat coal, bituminous coal, anthracite and coke, and of thermic reducing agent ferrosilicon, ferro-aluminium, ferro-aluminium-silicon and other materials containing metallic silicon, aluminium or calcium. The reducing agent or agents may be added in an excess of, for instance, at least 5% in relation to the quantity required for complete reduction of the ore; as a rule the excess is, however, kept higher, for instance 10%, or if cheap grades of coal are available up to 50 to 100% or still higher. Part of this excess will be recovered in the following separation of the reduced briquettes for extracting the finely divided metal sponge. Suitably a greater exccess of reducing agent may be applied in the surface layers of the briquettes than in the other layers of same, or the excess may be applied in these surface layers. When using carbonaceous reducing agent in the charge, the heat required for the reduction may be developed wholly or partly by combusting in the reduction chamber the gas formed in reduction with added, if desired preheated, air or oxidizing combustion gases. The additional fuel that may be required is suitably combusted in a special combustion chamber from which the combustion gases flow into the reduction chamber proper of the furnace used. Suitably the additional fuel may consist of gas obtained from an electric furnace, connected to the furnace for the sponge production, in which electric furnace the sponge briquettes are finally reduced and melted, if desired simultaneously with a briquetted or loose ore-carbon-charge especially supplied to the furnace, which charge, if desired, may contain reducing agent in shortness as compared with the amount required for complete reduction of the ore quantity contained in same, to compensate the excess of reducing agent supplied to the furnace with the sponge briquettes.

By the briquetting that is suitably carried out at as low a pressure as possible to obtain a great porosity of the briquettes, the separation of the grains of the ore and those of the reducing agent is prevented and thereby the agglomeration of ore onto the furnace walls, and the excess of reducing agent prevents, at least in a considerable degree, a reoxidation of the reduced metal, because the oxidizing constituents of the combustion gases, as oxygen, carbon dioxide and water vapor, react at the existing temperature with the reducing agent until equilibrium will be obtained between the oxidizing and the reducing constituents of the gases.

However, the briquettes are according to the above mentioned method in contact with the hot combustion gases during the whole reduction of the ore. As the briquettes are during a long time exposed to the action of the gases, there is a certain risk that especially the surfaces of the briquettes will be attacked by the combustion gases, so that the content of reducing agent in same will towards the end of the reduction become too low to prevent effectively a reoxidation of metal in the surfaces. Hence there is a risk that the content of metal oxide in the surfaces of the sponge briquettes will become higher than desirable, and thereby the average quality of the sponge lower than desired. Even in the case when the briquettes are provided with an extra surface layer of reducing agent or are made with a greater excess of reducing agent in the surface layers than in the other parts of same, and even if the combustion gases are deliberately kept less oxidizing by using air in deficit in the combustion, this risk will exist although somewhat decreased. By my present invention this risk will be practically completely eliminated.

What is mentioned above concerning briquetted charge with the combustion gases surrounding the briquettes during the treatment if briquettes of not too small size are used, holds true principally also for non-briquetted charge that is reduced in a rotary furnace, tunnel kiln or the like. Even with loose charge containing an excess of reducing agent a certain reoxidation of reduced metal will occur during the last part of the reduction by the flames sweeping over the charge. In tunnel kilns where, as a rule, the charge is reduced lying on carriages moving through the furnace especially the surface of the charge will be exposed to the flames and the combustion gases. The surface may certainly be covered by a layer of carbonaceous material, but the risk of reoxidation at the end of the reduction, when this layer has been burnt to a large extent, will always exist. In using a rotary furnace there will be no special surface of the charge that is most exposed to the combustion gases, as the charge is being turned over in the furnace and thereby its different parts changing place continuously, but instead the ore and the metal grains will separate from the coal grains and stick onto the hot furnace wall that is at the top of the furnace in direct contact with or exposed to the full radiation heat of the flame, whereby both reoxidation of metal and building up of charge in same will occur.

The main object of the present invention is to eliminate these risks practically completely and thus to prevent reoxidation of the metal reduced and sticking of charge to the furnace wall.

To this end the process according to the invention consists mainly in preparing a finely divided or comparatively finely divided mixture of metal oxide containing material and reducing agent in excess of the theoretical amount required for complete reduction of the metal oxides, and reducing said mixture, in a loose or briquetted state, in two successive stages in the following manner. In the first stage the mixture is reduced only incompletely but to a substantial degree so that the metal oxides are reduced in the main part by supplying to the mixture as charge in a furnace or in a section or zone of a furnace all or the main part of the heat, required for heating the charge to reduction temperature and for reducing the metal oxides, by means of hot combustion gases in contact with the charge and of such oxidizing character as to burn part at least of the reducing agent contained in the charge. Thereafter the charge is in the second stage further reduced to the desired degree of reduction in another furnace or chamber or section or zone of the furnace used out of contact with such oxidizing gases by the aid of heat stored up in the charge or heat indirectly supplied to the charge or both these kinds of heat.

Naturally the risk of reoxidation of metal already reduced is greatest during the last part of the reduction, that also requires a comparatively long time in proportion to the preceding reduction. The excess of reducing agent, such as coal or the like, is then considerably less than during the preceding reduction, and as moreover the combustion gases are hottest when first meeting the charge the influence of their oxidizing constituents will become most active if they meet on this occasion charge practically completely reduced. To attain a low content of oxygen in the product it is therefore to advantage to prevent the charge from coming in contact with the combustion gases or the flames during the last part of the reduction. For this purpose the charge is according to the invention, after having been to a substantial degree, for instance 75% to 95% of the reduction intended, reduced by means of the hot combustion gases in contact with the charge, transferred into a separate furnace or section or zone of the furnace where the charge does no longer come in contact with these gases, which therefore can no more act oxidizingly on the reducing agent and the reduced metal during the last critical stage of the reduction. Then the heat for the remaining reduction may be delivered either by heat contained in the charge that has been absorbed in same during the preceding heating with the combustion gases, or by heat supplied through inner or outer walls in this final reduction zone of the furnace or by heat from both these sources. The heat supply may, for instance, take place from channels or the like in the walls of the furnace or from one or more pipes or the like extending through the reduction chamber of the furnace and traversed by hot combustion gases. Suitably these heating means may be constructed as a combustion chamber or chambers for the additional fuel that is in some cases required for producing the combustion gases for the furnace or chamber or zone for the first part of the reduction. After having passed through these chambers, channels or pipes, the gases are then suitably introduced into the furnace or the section or zone of the furnace used in which they pass in opposite direction to the charge. Hereby the best possible utilization of the heat produced by the combustion of the additional fuel is attained. For the combustion preheated air may be used to advantage, heated, for instance, by indirect cooling of the sponge produced in the cooling zone of the furnace plant or by the utilized combustion gases escaping from the furnace plant.

In producing sponge iron, for instance, 5% to 10% of the reduction may be performed in the final reduction section without any extra supply of heat. If for instance briquettes containing iron ore with 64% metallic iron and anthracite in an excess of 125% are reduced, and the temperature of the briquettes is about 1000° C. when they enter into this furnace section, the fall in temperature will at a reduction of 5% in this section become about 60° C. and at 10% about 130° C. By the fall in temperature, however, the reduction will become slower, for which reason it is advantageous to supply additional heat to the final reduction section to increase the rate of reaction. Even a greater part of the reduction than 25% may be carried out in the final reduction section without the process departing from the scope of the invention, if only the main part of the heat required for the reduction and the heating of the charge to the suitable temperature is supplied by means of combustion gases in contact with the charge.

By reason of the final reduction taking place without any combustion gases present, the carbon monoxide produced in the final reduction with carbon, when carbonaceous material has been admixed as reducing agent, will fill the final reduction section of the furnace plant. Thus the charge will in this room be surrounded by strongly reducing gas. Especially if heat is supplied simultaneously to the furnace section, this reducing gas will thereby take part in the reduction of any ore grains still unreduced and of any reoxidized metal grains, especially on the surfaces of the briquettes when a briquetted charge is used, so that a product with a low content of oxygen is obtained. The unconsumed portion of the carbon monoxide flows admixed with carbon dioxide formed through the reduction from the final reduction section to the section for the first part of the reduction and is utilized therein. The reduction with gas in the final reduction section may, if desired, be assisted by introducing into this section strongly reducing, preferably preheated, gas, for instance, containing carbon monoxide and/or hydrogen and only comparatively small amounts of carbon dioxide and/or water vapor. This gas may then be utilized by combusting same, wholly or partly, with supplied air or other oxidizing gas, preheated or not, in the section for the first part of the reduction and in the section preceding this section for preheating and, if desired, prereducing the charge, or in the combustion chambers.

The supply of heat to the final reduction section should be adapted in such manner that no mentionable sintering of the charge will occur. However, the risk of sintering is rather small, especially if there is a great excess of carbon in the charge, and the charge is in a continuous motion during the reduction, because the charge does not in this part of the furnace come in direct contact with the flames or with wall surfaces directly exposed to same. The temperature in the combustion chambers or the heating channels, belonging to this section, should, however, be so adapted as to prevent the temperature of the charge close by the walls supplying the heat from becoming too high.

Below or after the final reduction section there is suitably arranged a cooling section in the furnace where the sponge is cooled by means of a suitable cooling medium, for instance air or water, that is conducted through a cooling mantle round or within this cooling section, so that the sponge can be withdrawn into the open air without fear of reoxidation. If strongly reducing gas is introduced into the final reduction section it may suitably be heated by leading same through the cooling section in contact with the charge, whereby the sponge will simultaneously be cooled.

In briquetting the charge any suitable binding agent may be used. In using carbon in a great excess calciferous binding agent, for instance lime white, may preferably be used, as the lime will bind a great part of the sulphur in the charge as calcium sulphide, that can thereafter be removed in the separation of the metal from carbon, gangue and the like, for instance in magnetic separator or wind separator. After the moulding a layer of carbon may be applied to the surfaces of the briquettes by strewing or blowing the fresh-formed, moist briquettes with powdered coal.

In carrying out the process according to the invention any suitable furnace arrangement may be used, for instance a shaft furnace tunnel kiln or rotary furnace, where the charge and the combustion gases pass through the furnace in oppposite directions to each other. A tunnel kiln or rotary furnace is used to special advantage when loose charge or small-sized briquettes, for instance of a size of peas to beans, are reduced, and a shaft furnace when briquettes of a larger size are used.

In the accompanying drawings there are shown in Figs. 1 and 2 a suitable furnace of the shaft furnace type for carrying out the process when using briquetted charge, and in Fig. 3 a furnace of the rotary type for loose charge, but the invention is in no way limited to these furnace arrangements or types of furnaces that are shown by way of example only. For loose or briquetted charge tunnel kilns may thus be built with fundamentally the same action and construction as the furnaces shown, which latter may also be varied in many ways without the invention being dependent thereupon.

Fig. 1 is a vertical section through a shaft furnace provided with a special cooling chamber, Fig. 2 being a cross-section on line A—A of Fig. 1.

Fig. 3 is a longitudinal vertical section through a rotary reduction furnace combined with an electric smelting furnace.

In Fig. 1 the furnace arrangement is shown as a furnace with the different sections built together so as to form a single unit, but the different sections or parts for carrying out the preheating, the first part of the reduction, the latter part of the reduction, and the cooling of the sponge may also be built in apparatus separated from but communicating with one another. The briquettes, preheated or not in a separate arrangement not shown in the drawings, for instance in connection with drying same, are introduced into the shaft furnace, composed of the casing 1 the lining 2 and the shaft 3 proper, through a feeding-apparatus 6 with double closures 4 and 5. The briquettes are thereby heated in the section indicated with 3a of the shaft 3 to reduction temperature, e. g., for sponge iron 850° to 1050° C., by hot combustion gases passing upwards through the shaft. In the section 3b of the shaft the main part of the reduction is thereafter carried out by means of the reducing agent contained in excess in the briquettes and the gas that may be developed from same. The briquettes enter then into the section or zone 3c of the shaft, where they practically do not come in contact with the combustion gases. In this case there is arranged round the shaft section 3c a combustion chamber 7, where the additional fuel required for the heat supply is combusted with air in the burners 8. Heat is thereby transmitted through the wall 10 to the shaft zone 3c during the final reduction. Thereafter the briquettes reduced to the desired degree enter the lowest section 3d of the shaft 3, that is arranged as a cooler for the hot sponge. In this case the cooling is effected by means of a hopper 18 with double walls 19 and 20, placed underneath the bottom plate 17 supporting the furnace walls. Air or water is used as cooling medium in the interspace 21 between the double walls. Thereafter the air may be utilized to advantage, for instance, in the burners 8. The sponge briquettes are discharged from the hopper 18 by the aid of the screws 22 and 23, rotated by any suitable means not shown in the drawings. To complete the cooling the sponge is transferred through further cooling means, for instance arranged round the discharging screws 22 and 23.

The combustion gases formed in combusting the fuel supplied through the burners 8 into the combustion chamber 7, which fuel may in some cases consist of combustible constituents containing gas escaping from the upper part of the shaft, flow from the chamber 7 after having heated the final reduction section 3c through the openings 9 in the furnace wall 10 into the reduction section 3b for the first part of the reduction. Thereby the combustion gases surround the briquettes and deliver to same the heat required for the reduction. The carbon monoxide formed in the reduction of the ore with the carbon as well as the carbon monoxide containing gas coming from the final reduction section 3c are also combusted, at least in part, in the interspaces between the briquettes in the shaft. On passing upwards through the shaft the combustion gases will, however, become enriched with combustible constituents by carbon monoxide formed, these combustible elements are in this case utilized higher up in the shaft by supplying air, preheated or not, through the openings 11 and 12 placed on different levels in the shaft wall 2. In this manner the content of oxidizing constituents in the combustion gases will increase in proportion as the gases meet charge with higher content of oxygen. The air is supplied to these openings through the pipes 13 and 14 from the ring-conduit 15 that is connected to a suitable air conduit 16. The quantities of air supplied are controlled by the valves 24 and 25. If a pressure below the atmospheric is used in the furnace the air may be introduced directly through the openings 11 and 12, which should in such case be provided with suitable regulating dampers. The combustion gases, after the addition of air being more strongly oxidizing, preheat and, if desired, also prereduce the briquettes in the shaft section 3a and escape thereafter through the annular space 26 between the furnace wall 2 and the feeding-apparatus 6 to the opening 27 in the shaft wall and further to a chimney conduit, not shown on the drawings. Thereafter the gases may suitably be used for drying fresh-formed briquettes, or if they contain combustible constituents as additional fuel in the burners 8. The pressure of the gases in the furnace may be controlled by regulating the pressure of the air and, if desired, that of the fuel in the burners 8 and the position of the damper 28 in the gas outlet 27. Preferably there is kept some over-pressure in the furnace. Addition of air through the openings 11 and 12 is suitably used only when the briquettes contain a comparatively high excess of carbon.

In Fig. 3 that shows a plant with a rotary reduction furnace the loose or briquetted charge is instead of being cooled directly transferred to an electric smelting furnace in which the completion of the reduction and the melting of the sponge is performed. Of course, a special cooling apparatus, for instance of the rotary type, may be used instead of the electric furnace if cool sponge is to be produced.

The charge is introduced into the preheating and prereduction zone $3a'$ of the rotary furnace 3 through the feeding-apparatus 6 and passes then through the reduction zone $3b'$ and $3c'$, which part of the furnace is built with a larger diameter than the preceding section to prolong the time for the charge to pass through this section. After having passed the open part $3b'$ of the reduction section in contact with combustion gases the charge enters into and passes the annular space $3c'$ between the furnace wall $31'$ of the enlarged section and the inner tubular wall $32'$, in which space it is heated indirectly from the flames in the combustion chamber $7'$ in the centre of the furnace without coming in contact with the flames or the combustion gases formed. From the space $3c'$ the charge then passes through the outlet 33 in the end wall $34'$ of the furnace to a feeding shaft $35'$ of the electric smelting furnace $36'$. Placed at the bottom of the shaft $35'$ there is one or more, preferably water-cooled, feeding screws 37 which introduce the sponge still containing some unreduced metal oxides into the smelting chamber $38'$. Through another feeding shaft $39'$ with the closures $4a$ and $5a'$ an ore-carbon-charge may, if desired, be introduced into the furnace to increase the development of reduction gas in same. The gas developed by the reduction in the furnace $36'$ is led off through the pipe $40'$ in the feeding shaft $39'$ to the burner $8'$ and burned with air supplied through the pipe $41'$ in the combustion chamber $7'$ at the end of the rotary reduction furnace. Gas from the electric furnace may also be led into the reduction zone $3c'$, to assist in the reduction in same, for instance, through the shaft $35'$ or through a separate pipe $44'$ from the pipe $40'$ or from the arch of the electric furnace. After having passed the combustion chamber $7'$ and thereby indirectly heated the zone $3c'$ the flames and the combustion gases formed flow through the reduction zone $3b$ where they give off to the charge the main part of the heat necessary for the reduction, causing the ore to be reduced in a substantial part by the reducing agent contained in the charge. The gas developed in the zone $3c'$ and in the zone $3b'$ is partly combusted above the charge in this latter zone and within the interspaces between the briquettes, if briquetted charge is used, in the section $3b'$ by the oxidizing combustion gases from the combustion chamber $7'$. The gases pass then through the preheating and prereduction section $3a'$ where a preheating and prereduction of the charge takes place. During the passage through the rotary furnace air may be supplied to the combustion gases through the air inlets $11'$ and $12'$. If compressed air is used the air is led to the ring conduits 15 and $15a$ through a pipe not shown in the drawings. Thereafter the combustion gases preheat the charge in the last part of the zone $3a'$ and are led off through the outlet $27'$ to a dust collecting chamber $42'$ and further to a chimney $43'$ with the damper $28'$.

The process according to the invention is not limited to the metal, materials, sizes of grains or briquettes, nor to the furnace arrangements which have hereinbefore been mentioned by way of example only, but comprises any production of metal in a spongy state or metal sponge containing material with the use of the method set forth.

What I claim as new and desire to secure by Letters Patent of the United States of America is:—

1. A process for producing metal sponge, consisting in mixing finely divided metal oxide containing material and finely divided reducing agent, the latter in excess of the theoretical amount required for reduction, reducing the metal oxides in the mixture to a state a little short of complete reduction by supplying to the mixture in a furnace the heat, required for heating the mixture to reduction temperature and for reducing the metal oxides, by means of hot combustion gases in contact with the mixture, said gases meeting the mixture in the furnace and being of such an oxidizing character as to burn part at least of the excess of reducing agent in the mixture, and further reducing the mixture to the desired degree out of contact with such oxidizing combustion gases by the aid of heat stored up in the mixture.

2. A process for producing metal sponge, consisting in mixing finely divided metal oxide containing material and finely divided reducing agent, the latter in excess of the theoretical amount required for reduction, reducing the mixture incompletely but to a substantial degree by supplying to same as a charge in a furnace the main part of the heat, required for heating the charge to reduction temperature and for reducing the metal oxides, by means of hot combustion gases in contact with the charge, said gases meeting the charge and being of such an oxidizing character as to burn part at least of the excess of reducing agent in the charge, and further reducing the charge to the desired degree out of contact with such oxidizing gases by the aid of heat stored up in the charge and heat indirectly supplied to the charge.

3. A process for producing metal sponge, consisting in mixing finely divided metal oxide containing material and finely divided reducing agent, the latter in excess of the theoretical amount required for reduction, forming the mixture into briquettes, reducing the briquettes incompletely but to a substantial degree by supplying to same as a charge in the furnace the main part of the heat, required for heating the charge to reduction temperature and for reducing the metal oxides, by means of hot combustion gases in contact with the charge, said gases meeting the charge and being of such an oxidizing character as to burn at least part of the excess of reducing agent in the charge, and further reducing the charge to the desired degree out of contact with such oxidizing gases by the aid of heat indirectly supplied to the charge.

4. A process for producing metal sponge, consisting in mixing finely divided metal oxide containing material and finely divided reducing agent including carbonaceous material, the reducing agent in excess of the theoretical amount required for reduction, reducing the metal oxides in the mixture to a state a little short of complete reduction by supplying to the mixture as a charge in a furnace the main part of the heat, required for heating the charge to reduction temperature and for reducing the metal oxides, by means of hot gases in contact with the charge, said gases meeting the charge and being of such an oxidizing character as to burn at least part of the excess of reducing agent in the charge, and finally reducing the charge to the desired degree out of contact with such oxidizing gases by the aid of heat indirectly supplied to the charge.

5. A process for producing metal sponge, consisting in mixing finely divided metal oxide containing material and finely divided reducing agent, the latter in excess of the theoretical amount required for reduction, forming the mixture into briquettes, applying excessive carbonaceous reducing agent to the surfaces of the briquettes, reducing the briquettes thus treated incompletely but to a substantial degree by supplying to same as a charge in a furnace the main part of the heat, required for heating the charge to the reduction temperature and for reducing the metal oxides, by means of hot combustion gases in contact with the charge, said gases meeting the charge and being of such an oxidizing character as to burn at least part of the excess of reducing agent in the charge, and further reducing the charge to the desired degree out of contact with such oxidizing gases by the aid of heat indirectly supplied to the charge.

6. A process for producing metal sponge, consisting in mixing finely divided metal oxide containing material and finely divided reducing agent, the latter in excess of the theoretical amount required for reduction, reducing the mixture incompletely but to a substantial degree by supplying to same as a charge in a furnace the main part of the heat, required for heating the charge to reduction temperature and for reducing the metal oxides, by means of hot combustion gases in contact with the charge, said gases meeting the charge and being developed through combustion of fuel with air in a quantity less than the theoretical amount required for complete oxidation of the combustible elements of the fuel, and finally reducing the charge to the desired degree out of contact with such oxidizing combustion gases by the aid of heat indirectly supplied to the charge.

7. A process for producing metal sponge, consisting in mixing finely divided metal oxide containing material and finely divided carbonaceous reducing agent, the latter in excess of the theoretical amount required for reduction, reducing the mixture incompletely but to a substantial degree as a charge in a furnace by means of heat given off by combustion gases in contact with the charge, said gases meeting the charge and being developed through combustion with oxidizing gases of added fuel and of gas produced from the reducing agent in the charge, while controlling the combustion through adding air for combustion to the furnace successively in such way that the content of oxidizing constituents in the combustion gases is proportionate to the oxygen in the charge which the gases come in contact with, and finally reducing the charge to the desired degree of reduction out of contact with such oxidizing combustion gases by the aid of heat indirectly supplied to the charge.

8. A process for producing metal sponge, consisting in mixing finely divided metal oxide containing material and finely divided carbonaceous reducing agent, the latter in excess of the theoretical amount required for reduction, reducing the mixture incompletely but to a substantial degree as a charge in a furnace by means of heat given off by combustion gases in contact with the charge, said gases meeting the charge and being of such an oxidizing character as to burn at least part of the excess of reducing agent in the charge and being developed through combustion with oxidizing gases of gas produced from said carbonaceous reducing agent, and further reducing the charge to the desired degree out of contact with such oxidizing gases by the aid of heat indirectly supplied to the charge.

9. A process for producing metal sponge, consisting in mixing finely divided metal oxide containing material and finely divided carbonaceous reducing agent, the latter in excess of the amount theoretically required for reduction, reducing the mixture incompletely but to a substantial degree as a charge in a furnace by means of heat given off by combustion gases in contact with the charge, said gases meeting the charge and being of such an oxidizing character as to burn at least part of the excess of the reducing agent in the charge and being developed through combustion with oxidizing gases of additional fuel and of gas produced from said carbonaceous reducing agent, and further reducing the charge to the desired degree out of contact with such oxidizing combustion gases by the aid of heat indirectly supplied to the charge.

10. A process for producing metal sponge, consisting in mixing finely divided metal oxide containing material and finely divided carbonaceous reducing agent, the latter in excess of the theoretical amount required for reduction, reducing the mixture incompletely but to a substantial degree by supplying to same as a charge in a furnace the main part of the heat, required for heating the charge to reduction temperature and for reducing the metal oxides, by means of hot combustion gases in contact with the charge, said gases meeting the charge and being of such an oxidizing character as to burn at least part of the excess of reducing agent in the charge and being developed through combustion with oxidizing gases of additional fuel and of gas produced from the carbonaceous reducing agent, further reducing the charge to the desired degree out of contact with such oxidizing combustion gases by the aid of heat indirectly supplied to the charge, and using the combustion gases from the additional fuel for the first and main part of the reduction for indirectly heating the charge in the latter part of the reduction before they come in contact with the charge.

11. A process for producing metal sponge, consisting in mixing finely divided metal oxide containing material and finely divided carbonaceous reducing agent, the latter in excess of the theoretical amount required for reduction, reducing the mixture incompletely but to a substantial degree by supplying to same as a charge in a furnace the main part of the heat, required for heating the charge to reduction temperature and for reducing the metal oxides, by means of hot combustion gases in contact with the charge, said gases meeting the charge and being of such an oxidizing character as to burn at least part of the excess of reducing agent in the charge and being developed through combustion with oxidizing gases of additional fuel and of gas produced from the carbonaceous reducing agent, further reducing the charge to the desired degree out of contact with such oxidizing combustion gases by the aid of heat indirectly supplied to the charge, and using the combustion gases from the additional fuel for the first and main part of the reduction for indirectly heating the charge in the latter part of the reduction by passing same through heating chambers closed against the section of the furnace in which said latter part of the reduction is carried out, before the gases come in contact with the charge.

12. A process for producing metal sponge, consisting in mixing finely divided metal oxide containing material and finely divided reducing agent, the latter in excess of the theoretical amount required for reduction, reducing the mixture incompletely but to a substantial degree by supplying the same as a charge in a furnace the main part of the heat required for heating the charge to reduction temperature and for reducing the metal oxides by means of hot combustion gases in contact with the charge, said gases meeting the charge and being of such an oxidizing character as to burn at least part of the excess of reducing agent in the charge, and finally reducing the charge to the desired degree out of contact with such oxidizing combustion gases by the aid of heat indirectly supplied to the charge, the additional fuel used for producing said combustion gases being combusted in a combustion chamber closed against the final reduction section of the furnace used and thereby indirectly heating said final reduction section.

13. A process for producing metal sponge, consisting in mixing finely divided metal oxide containing material and finely divided reducing agent, the latter in excess of the theoretical amount required for reduction, reducing the mixture incompletely but to a substantial degree by supplying to same as a charge in a furnace the main part of the heat required for heating the charge to reduction temperature and for reducing the metal oxides by means of hot combustion gases in contact with the charge, said gases meeting the charge and being of such an oxidizing character as to burn at least part of the excess of reducing agent in the charge, and finally reducing the charge to the desired degree out of contact with such oxidizing gases by the aid of heat indirectly supplied to the charge, the additional fuel used for producing said combustion gases being combusted in a combustion chamber closed against and surrounding the final reduction section of the furnace used and thereby indirectly heating said final reduction section.

14. A process for producing metal sponge, consisting in mixing finely divided metal oxide containing material and finely divided reducing agent, the latter in excess of the theoretical amount required for reduction, reducing the mixture incompletely but to a substantial degree by supplying to same as a charge in a furnace the main part of the heat required for heating the charge to reduction temperature and for reducing the metal oxides by means of hot combustion gases in contact with the charge, said gases meeting the charge and being of such an oxidizing character as to burn at least part of the excess of reducing agent in the charge, and finally reducing the charge to the desired degree out of contact with such oxidizing gases by the aid of heat indirectly supplied to the charge, while passing hot strongly reducing gas through the section of the furnace used for said final reduction in contact with the charge in same.

15. A process for producing metal sponge, consisting in mixing finely divided metal oxide containing material and finely divided reducing agent, the latter in excess of the theoretical amount required for reduction, reducing the mixture incompletely but to a substantial degree by supplying to same as a charge in a furnace the main part of the heat required for heating the charge to reduction temperature and for reducing the metal oxides by means of hot combustion gases in contact with the charge, said gases meeting the charge and being of such an oxidizing character as to burn at least part of the excess of reducing agent in the charge, and finally reducing the charge to the desired degree out of contact with such oxidizing gases by the aid of heat indirectly supplied to the charge, while passing hot strongly reducing gas through the furnace section used for said final reduction in contact with the charge in same, said reducing gas being heated by passing same through a cooling section of the furnace in contact with the reduced charge.

16. A process for producing metal sponge, consisting in mixing finely divided metal oxide containing material and finely divided carbonaceous reducing agent, the latter in excess of the theoretical amount required for reduction, reducing the mixture incompletely but to a substantial degree by supplying to same as a charge in a reduction furnace the main part of the heat required for heating the charge to reduction temperature and for reducing the metal oxides by means of hot combustion gases in contact with the charge, said gases meeting the charge and being of such an oxidizing character as to burn at least part of the excess of reducing agent in the charge, and further reducing the charge to the desired degree out of contact with such oxidizing gases by the aid of heat indirectly supplied to the charge from combustion gases developed through combustion of additional fuel in a combustion chamber of the reduction furnace, said fuel comprising gas produced in an electric smelting furnace, combined with the reduction furnace, by reduction of remaining non-reduced metal oxides in the charge with remaining reducing agent in same.

17. A process for producing metal sponge, consisting in mixing finely divided metal oxide containing material and finely divided carbonaceous reducing agent, the latter in excess of the theoretical amount required for reduction, reducing the mixture incompletely but to a substantial degree by supplying to same as a charge in a reduction furnace the main part of the heat required for heating the charge to reduction temperature and for reducing the metal oxides by means of hot combustion gases in contact with the charge, said gases meeting the charge and being of such an oxidizing character as to burn at least part of the excess of reducing agent in the charge, and further reducing the charge to the desired degree out of contact with such oxidizing gases by the aid of heat indirectly supplied to the charge from combustion gases developed through combustion of additional fuel in a combustion chamber of the reduction furnace, said fuel comprising gas produced in an electric smelting furnace, combined with the reduction furnace, by reduction of remaining non-reduced metal oxides in the charge with remaining reducing agent in same together with another charge, separately fed in, containing oxide ore and carbonaceous reducing agent, the latter in shortness of the theoretical amount required for reduction of the ore in said latter charge.

18. A process for producing metal sponge, consisting in mixing finely divided metal oxide containing material and finely divided carbonaceous reducing agent, the latter in excess of the theoretical amount required for reduction, reducing the mixture incompletely but to a substantial degree by supplying to same as a charge in a reduction furnace the main part of the heat required for heating the charge to reduction temperature and for reducing the metal oxides by means of hot combustion gases in contact with the charge, said gases meeting the charge and being of such an oxidizing character as to burn at least part of the excess of reducing agent in the charge, and further reducing the charge to the desired degree out of contact with such oxidizing gases by the aid of heat indirectly supplied to the charge from combustion gases developed through combustion of additional fuel in a combustion chamber of the reduction furnace, said fuel comprising gas produced in an electric smelting furnace, combined with the reduction furnace, by reduction of remaining non-reduced metal oxides in the charge with remaining reducing agent in same together with another charge, separately fed in, containing oxide ore and carbonaceous reducing agent, the latter in shortness of the theoretical amount required for reduction of the ore in said latter charge, while passing a portion of said reduction gas obtained in the electric furnace through the section of the reduction furnace used for said latter reduction in contact with the charge in same.

19. A process for producing iron sponge, consisting in mixing finely divided iron ore and finely divided carbonaceous reducing agent, the latter in excess of the amount theoretically required for reduction, reducing the mixture incompletely but to a substantial degree by supplying to same in a furnace the main part of the heat required for heating the mixture to reduction temperature and for reducing the ore, by means of hot combustion gases in contact with the mixture, said gases meeting the charge and being of such an oxidizing character as to burn at least part of the excessive reducing agent in the mixture, and further reducing the mixture to the desired degree of reduction out of contact with such oxidizing gases by the aid of heat indirectly supplied to the mixture.

20. A process for producing chrome-iron sponge, consisting in mixing iron oxides containing material and chrome oxide containing material, carbonaceous reducing material and thermic reducing agent, all in a finely divided state, the total quantity of the reducing agents in excess of the theoretical amount required for reduction of the metal oxides contained in the mixture, forming the mixture into briquettes, reducing the iron oxides in said briquettes in a reduction furnace by means of heat given off by hot combustion gases in contact with the briquettes, said gases meeting the charge in said furnace and being of such an oxidizing character as to burn at least part of the excess of reducing agents contained in the charge, and further heating the charge out of contact with such oxidizing gases so that the chrome oxides in same are reduced by the thermic reducing agent admixed.

In testimony whereof I affix my signature.

EMIL GUSTAF TORVALD GUSTAFSSON.